US012551998B2

(12) United States Patent
Hegarty et al.

(10) Patent No.: US 12,551,998 B2
(45) Date of Patent: Feb. 17, 2026

(54) FLYWHEEL DRIVEN FASTENING TOOL HAVING AT LEAST TWO TIMEOUT PERIODS FOR DETERMINING WHEN TO STOP DRIVING FLYWHEEL

(71) Applicant: Black & Decker Inc., New Britain, CT (US)

(72) Inventors: Daniel Hegarty, Baltimore, MD (US); Michael Justis, Towson, MD (US); Jongsoo Lim, Timomium, MD (US); Jim Schroeder, Dallastown, PA (US); Larry E. Gregory, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/289,992

(22) PCT Filed: May 24, 2022

(86) PCT No.: PCT/US2022/030664
§ 371 (c)(1),
(2) Date: Nov. 8, 2023

(87) PCT Pub. No.: WO2022/251171
PCT Pub. Date: Dec. 1, 2022

(65) Prior Publication Data

US 2024/0261950 A1 Aug. 8, 2024

Related U.S. Application Data

(60) Provisional application No. 63/192,377, filed on May 24, 2021.

(51) Int. Cl.
*B25C 1/06* (2006.01)

(52) U.S. Cl.
CPC .................................... *B25C 1/06* (2013.01)

(58) Field of Classification Search
CPC ...................................................... B25C 1/06
(Continued)

(56) References Cited

U.S. PATENT DOCUMENTS

| | | | |
|---|---|---|---|
| 4,747,455 | A | 5/1988 | Cunningham |
| 5,443,196 | A | 8/1995 | Burlington |

(Continued)

FOREIGN PATENT DOCUMENTS

| | | | |
|---|---|---|---|
| DE | 102009028437 A1 | 2/2010 | |
| DE | 102009028312 A1 | 3/2010 | |

(Continued)

OTHER PUBLICATIONS

International Search Report and Written Opinion of the ISA issued in PCT/US2022/030664, mailed Oct. 17, 2022; ISA/EP.

*Primary Examiner* — Chinyere J Rushing-Tucker
(74) *Attorney, Agent, or Firm* — Harness, Dickey & Pierce, P.L.C.

(57) ABSTRACT

A controller for a flywheel driven fastening tool that keeps the flywheel active at or near a ready-to-fire state, for a defined period of time without the continuous user input into the trigger switch or contact trip. The controller controls two (2) or more different timeout periods and flywheel speeds that occur due to different scenarios, such as variations in the user input at the trigger and contact trip. As a result, the controller reduces the wait time for the flywheel to return to a target speed. Thus, user time for performing a nailer application with a flywheel nailer is decreased.

24 Claims, 9 Drawing Sheets

(58) Field of Classification Search
USPC .............................................................. 227/2
See application file for complete search history.

(56) References Cited

U.S. PATENT DOCUMENTS

| | | | |
|---|---|---|---|
| 5,732,870 | A | 3/1998 | Moorman et al. |
| 5,918,788 | A | 7/1999 | Moorman et al. |
| 6,382,492 | B1 | 5/2002 | Moorman et al. |
| 6,431,425 | B1 | 8/2002 | Moorman et al. |
| 6,604,666 | B1 | 8/2003 | Pedicini et al. |
| 6,705,503 | B1 | 3/2004 | Pedicini et al. |
| 6,769,593 | B2 | 8/2004 | Pedicini et al. |
| 7,469,811 | B2 | 12/2008 | Shima et al. |
| 7,494,036 | B2 | 2/2009 | Shima et al. |
| 7,646,157 | B2 | 1/2010 | Cruise et al. |
| 7,934,565 | B2 | 5/2011 | Krondorfer et al. |
| RE43,041 | E | 12/2011 | Adams et al. |
| 8,167,182 | B2 | 5/2012 | Shima et al. |
| 8,313,012 | B2 | 11/2012 | Shima et al. |
| 10,322,501 | B2 | 6/2019 | Garber et al. |
| 11,097,408 | B2 | 8/2021 | Akiba |
| 2010/0038397 | A1 | 2/2010 | Krondorfer et al. |
| 2016/0207185 | A1* | 7/2016 | Garber .................... B25C 1/008 |
| 2020/0034633 | A1 | 1/2020 | Ikeda |
| 2020/0039044 | A1 | 2/2020 | Akiba |
| 2021/0021215 | A1 | 1/2021 | Tsai et al. |

FOREIGN PATENT DOCUMENTS

| | | | |
|---|---|---|---|
| DE | 102009028331 | A1 | 4/2010 |
| DE | 102019120546 | A1 | 2/2020 |
| DE | 102021124712 | A1 | 3/2022 |
| EP | 2450152 | A2 | 5/2012 |
| EP | 1777040 | B1 | 1/2013 |
| EP | 2397269 | B1 | 9/2014 |
| EP | 2714339 | B1 | 1/2018 |
| EP | 3156182 | B1 | 4/2018 |
| EP | 3632623 | A1 | 4/2020 |
| EP | 3663049 | A1 | 6/2020 |
| EP | 3750672 | B1 | 3/2022 |
| EP | 3733350 | B1 | 6/2022 |
| EP | 3766638 | B1 | 9/2022 |
| EP | 4296008 | A1 | 12/2023 |
| JP | H08197455 | A | 8/1996 |
| JP | 2008068358 | A | 3/2008 |

* cited by examiner

FLYWHEEL DRIVEN FASTENING TOOL HAVING AT LEAST TWO TIMEOUT PERIODS FOR DETERMINING WHEN TO STOP DRIVING FLYWHEEL

CROSS-REFERENCE TO RELATED APPLICATIONS

This application is the U.S. National Phase Application under 35 U.S.C. 371 of International Application No. PCT/US2022/030664 filed on May 24, 2022, which claims the benefit of U.S. Provisional Application No. 63/192,377, filed on May 24, 2021. The entire disclosures of the applications referenced above are incorporated herein by reference.

FIELD

The present disclosure relates to flywheel driven fastening tools, such as a cordless electric nailer, and more particularly to flywheel driven fastening tools having at least two timeout periods for determining when to stop driving the flywheel.

BACKGROUND

This section provides background information related to the present disclosure which is not necessarily prior art.

Flywheel driven fastening tools typically include a rotating flywheel that engages a driver to impart energy to the driver, causing the driver to move and drive or deform the fastener. Thus, a drive motor assembly can include an electric motor coupled to the flywheel to rotate the flywheel without engaging the driver. When activated, the drive motor assembly causes the rotating flywheel and driver to engage each other to propel the driver from the returned position to the extended position. In a cordless electric nailer, for example, fasteners, such as nails, are driven into a workpiece by a driver blade or driver through a process known as a "drive" or "drive cycle". Generally, a drive cycle involves the driver striking a fastener head during a drive stroke to an extended position and returning to a home or returned position during a return stroke. The structure of the drive motor assembly can result in changes in the attack angle or other changes that affect the efficiency with which the energy is transferred from the flywheel to the driver as the driver wears over the life of the tool.

Flywheel driven fastening tools have a fastener firing speed problem: The time it takes to fire a fastener is limited by the time it takes for the tool's motor to spool-up the flywheel to the target RTF ("Ready-to-Fire") speed (RPM) needed to successfully drive a fastener.

Currently, many flywheel driven fastening tools, such as flywheel nailers, have flywheel motors that are deactivated without user input. User input includes holding either the trigger switch or contact trip switch closed. Without user input, the maximal wait time for spooling up the flywheel is experienced by the user if the Flywheel RPM is allowed to return to rest (0 RPM).

Accordingly, there remains a need to improve flywheel driven fastening tools to address the problems identified above or to address other problems of flywheel motors.

SUMMARY

This section provides a general summary of the disclosure, and is not a comprehensive disclosure of its full scope or all of its features.

A fastening tool for installing a fastener into a workpiece is described herein. The fastening tool includes a driver, a controller, and a motor assembly including a motor, a flywheel, and an actuator. In one example, the controller is configured to control the motor to drive the flywheel when a first input satisfies a first condition, control the actuator to engage the driver with the flywheel, and thereby actuate the driver to drive the fastener into the workpiece, when a second input satisfies a second condition, control the motor to stop driving the flywheel when the motor has driven the flywheel for a first period and the first input has satisfied the first condition for at least the first period, and control the motor to stop driving the flywheel when the motor has driven the flywheel for a second period and at least one of (i) the first input no longer satisfies the first condition and (ii) the second input does not satisfy the second condition.

In one aspect, the controller is configured to control the motor to stop driving the flywheel when the motor has driven the flywheel for the second period and the first input no longer satisfies the first condition.

In one aspect, the controller is configured to control the motor to stop driving the flywheel when the motor has driven the flywheel for the second period and the second input does not satisfy the second condition.

In one aspect, the duration of the second period is different than the duration of the first period.

In one aspect, the duration of the second period is greater than the duration of the first period.

In one aspect, the fastening tool further includes a contact trip switch and a trigger switch, the first input satisfies the first condition when the contact trip switch is closed, and the second input satisfies the second condition when the trigger switch is closed.

In one aspect, the controller is configured to control the actuator to actuate the driver when both the contact trip switch and the trigger switch are closed.

In one aspect, after the driver is actuated, the controller is configured to control the motor to drive the flywheel regardless of whether the contact trip switch or the trigger switch is closed.

In one aspect, after the driver is actuated to perform a discharge, the controller is configured to control the actuator to actuate the driver for a second time when the contact trip switch has been opened and closed since the discharge and the trigger switch is closed, control the motor to stop driving the flywheel when the contact trip switch has been held closed since the discharge and the motor has driven the flywheel for the first period, and control the motor to stop driving the flywheel when the contact trip switch has been opened since the discharge, at least one of the contact trip switch and the trigger switch is open, and the motor has driven the flywheel for the second period.

In one aspect, after the driver is actuated to perform a discharge, the controller is configured to control the actuator to actuate the driver for a second time when both the trigger switch and the contact trip switch are closed and have been opened since the discharge, control the motor to stop driving the flywheel when the contact trip switch has been held closed since the discharge and the motor has driven the flywheel for the first period, and control the motor to stop driving the flywheel when the contact trip switch has been opened since the discharge, at least one of the contact trip switch and the trigger switch is open, and the motor has driven the flywheel for the second period.

In one aspect, during the first and second periods, the controller is configured to control the motor to adjust the speed of the flywheel to a target flywheel speed for driving the fastener into the workpiece.

In another example, the fastening tool further includes a contact trip switch and trigger switch, and the controller is configured to control the motor to drive the flywheel when the trigger switch is closed, control the actuator to engage the driver with the flywheel, and thereby actuate the driver to drive the fastener into the workpiece, when the contact trip switch is closed, control the motor to stop driving the flywheel when the contact trip switch is open, the motor has driven the flywheel for a first period, and the trigger switch has been held closed for at least the first period, and control the motor to stop driving the flywheel when at least one of the contact trip switch and the trigger switch is open and the motor has driven the flywheel for a second period. The duration of the second period is different than the duration of the first period.

In one aspect, the duration of the second period is greater than the duration of the first period.

In one aspect, the controller is configured to control the actuator to actuate the driver when both the contact trip switch and the trigger switch are closed.

In one aspect, after the driver is actuated, the controller is configured to control the motor to drive the flywheel regardless of whether the contact trip switch or the trigger switch is closed.

In one aspect, after the driver is actuated to perform a discharge, the controller is configured to control the actuator to actuate the driver for a second time when the contact trip switch is closed and the trigger switch has been opened and closed since the discharge, control the motor to stop driving the flywheel when the trigger switch has been held closed since the discharge and the motor has driven the flywheel for the first period, and control the motor to stop driving the flywheel when the trigger switch has been opened since the discharge, at least one of the contact trip switch and the trigger switch is open, and the motor has driven the flywheel for the second period.

In one aspect, after the driver is actuated to perform a discharge, the controller is configured to control the actuator to actuate the driver for a second time when the contact trip switch has been opened and closed since the discharge and the trigger switch is closed, control the motor to stop driving the flywheel when the trigger switch has been held closed since the discharge and the motor has driven the flywheel for the first period, and control the motor to stop driving the flywheel when the trigger switch has been opened since the discharge, at least one of the contact trip switch and the trigger switch is open, and the motor has driven the flywheel for the second period.

In one aspect, during the first and second periods, the controller is configured to control the motor to adjust the speed of the flywheel to a target flywheel speed for driving the fastener into the workpiece.

In another example, the fastening tool further includes a sensor and a trigger switch, and the controller is configured to control the motor to drive the flywheel when the sensor detects the presence of a user, control the actuator to engage the driver with the flywheel, and thereby actuate the driver to drive the fastener into the workpiece, when the trigger switch is closed, control the motor to stop driving the flywheel when the trigger switch is open and the motor has driven the flywheel for a first period, and control the motor to stop driving the flywheel when the sensor no longer detects the presence of the user and the motor has driven the flywheel for a second period. The duration of the second period is different than the duration of the first period.

In one aspect, the fastening tool further includes a contact trip switch, and the controller is configured to control the actuator actuate the driver when both the contact trip switch and the trigger switch are closed.

In one aspect, the fastening tool further includes a handle, and the sensor is a contact sensor on the handle.

In one aspect, the sensor is an accelerometer configured to detect when the fastening tool is at least one of picked up by the user and in use.

In one aspect, the sensor is a proximity sensor configured to detect the presence of a device on the person of the user.

In one aspect, the sensor is a Bluetooth sensor configured to communicate with a Bluetooth-enabled device on the person of the user.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
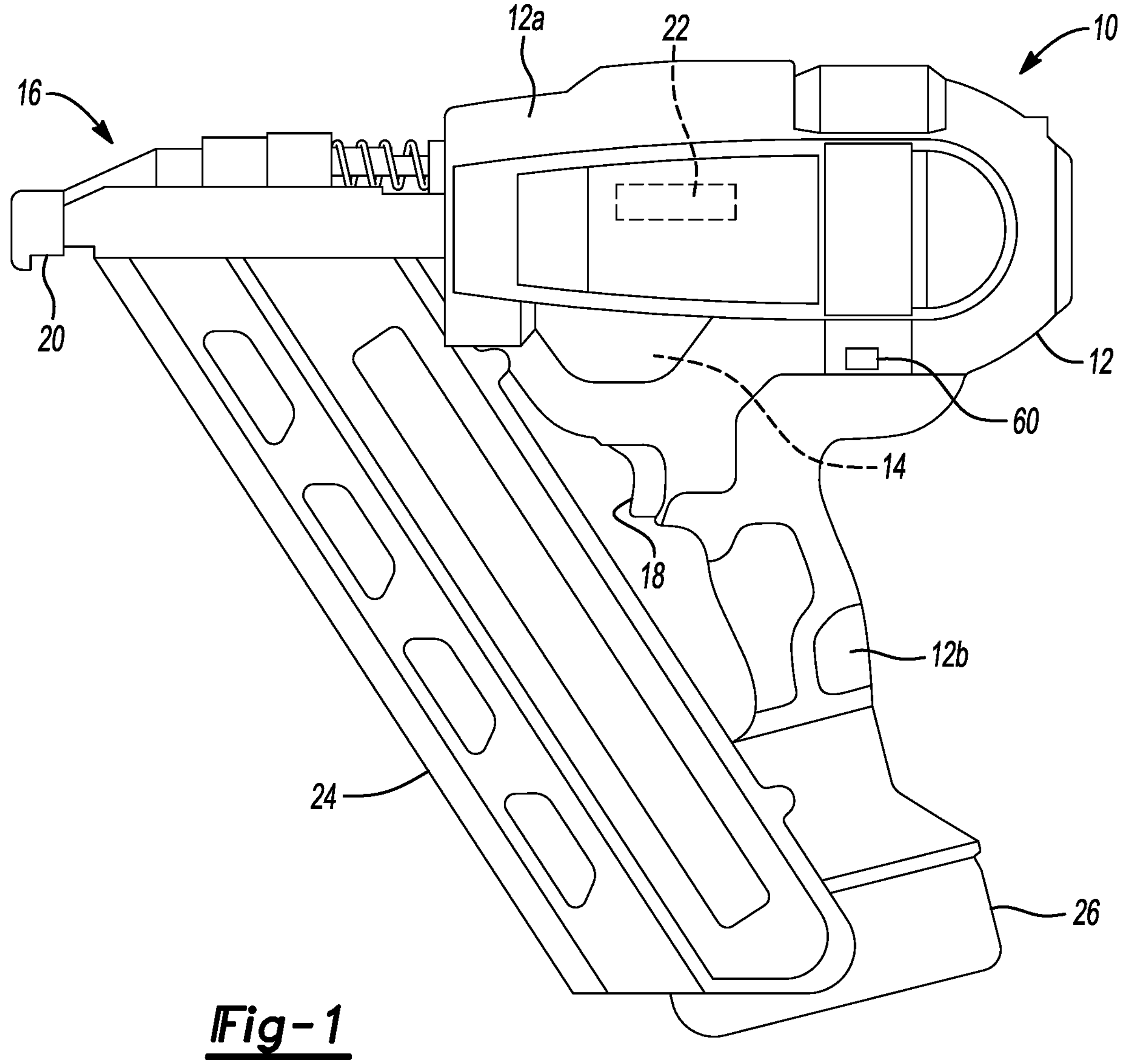
FIG. 1 is a side elevation view of an exemplary fastening tool.

Referring now FIGS. 1 and 2, a fastening tool 10 according to the present disclosure includes a housing 12, a motor assembly 14, a nosepiece assembly 16, a trigger 18, a contact trip 20, a control unit 22, a magazine 24, and a battery 26, which provides electrical power to the various sensors (which are discussed in detail, below) as well as the motor assembly 14 and the control unit 22. Those skilled in the art will appreciate from this disclosure, however, that in place of, or in addition to the battery 26, the fastening tool 10 may include an external power cord (not shown) for connection to an external power supply (not shown). Thus, the fastening tool is electrically powered by a suitable electric power source or electric energy storage device, such as the battery 26.

Furthermore, while aspects of the present invention are described herein and illustrated in the accompanying drawings in the context of a fastening tool, those of ordinary skill in the art will appreciate that the invention, in its broadest aspects, has further applicability. For example, the drive motor assembly 14 may also be employed in various other mechanisms that use reciprocating motion, including rotary hammers, hole forming tools, such as punches, and riveting tools, such as those that install deformation rivets.

The housing 12 may include a body portion 12*a*, which may be configured to house the motor assembly 14 and the control unit 22, and a handle 12*b*. The handle 12*b* may provide the housing 12 with a conventional pistol-grip appearance and may be unitarily formed with the body portion 12*a* or may be a discrete fabrication that is coupled to the body portion 12*a*, as by threaded fasteners (not shown). The handle 12*b* may be contoured so as to ergonomically fit a user's hand and/or may be equipped with a resilient and/or non-slip covering, such as an overmolded thermoplastic elastomer.

The motor assembly 14 may include a driver 28 and a power source 30 that is configured to selectively transmit power to the driver 28 to cause the driver 28 to translate along an axis. In the particular example provided, the power source 30 includes an electric motor 32, a flywheel 34, which is coupled to an output shaft 32*a* of the electric motor 32, a pinch roller assembly 36, and an actuator 44. In operation, fasteners F are stored in the magazine 24, which sequentially feeds the fasteners F into the nosepiece assembly 16.

The motor assembly 14 may be actuated by the control unit 22 to cause the driver 28 to translate and impact a fastener F in the nosepiece assembly 16 so that the fastener F may be driven from the nosepiece assembly 16 and into a workpiece (not shown). Actuation of the power source 30 may utilize electrical energy from the battery 26 to operate the motor 32 and the actuator 44. The motor 32 is employed to drive the flywheel 34, while the actuator 44 is employed to move a roller 46 that is associated with a roller assembly 36. The motor 32 can be drivingly coupled to the flywheel 34 in any suitable manner.

In the example provided, the motor 32 is drivingly coupled to the flywheel 34 via a belt 32*b* drivingly coupled to the output shaft 32*a* of the motor 32 and an input 34*a* of the flywheel 34. In an alternative construction, not specifically shown, the motor 32 can be directly connected to the flywheel 34. For example, the motor 32 can be an inside-out or outer-rotor brushed or brushless motor, having the rotor of the motor 32 disposed about the stator coils of the motor 32. In such a configuration, the rotor of the motor 32 can be integrally formed with or fixedly coupled to the flywheel 34 for common rotation about the stator of the motor 32.

Returning to the example provided, the roller assembly 36 presses the driver 28 into engagement with the flywheel 34 so that mechanical energy may be transferred from the flywheel 34 to the driver 28 to cause the driver 28 to translate along the axis. The nosepiece assembly 16 guides the fastener F as it is being driven into the workpiece (not shown). A return mechanism (not shown) can include a spring member that biases the driver 28 into a returned position.

The trigger 18 may be coupled to the housing 12 and is configured to receive an input from the user, typically by way of the user's finger, which may be employed in conjunction with a trigger switch 18*a* to generate a trigger signal that may be employed in whole or in part to initiate the cycling of the fastening tool 10 to install a fastener F to a workpiece (not shown).

The contact trip 20 may be coupled to the nosepiece assembly 16 for sliding movement thereon. The contact trip 20 is configured to slide rearwardly in response to contact with a workpiece (not shown) and may interact either with the trigger 18 or a contact trip sensor or switch 50. In the former case, the contact trip 20 cooperates with the trigger 18 to permit the trigger 18 to actuate the trigger switch 18*a* to generate the trigger signal. More specifically, the trigger 18 may include a primary trigger, which is actuated by a finger of the user, and a secondary trigger, which is actuated by sufficient rearward movement of the contact trip 20. Actuation of either one of the primary and secondary triggers will not, in and of itself, cause the trigger switch 18*a* to generate the trigger signal. Rather, both the primary and the secondary trigger must be placed in an actuated condition to cause the trigger switch 18*a* to generate the trigger signal.

In the latter case (i.e., where the contact trip 20 interacts with the contact trip switch 50), which is employed in the example provided, rearward movement of the contact trip 20 by a sufficient, predetermined amount causes the contact trip switch 50 to generate a contact trip signal, which may be employed in conjunction with the trigger signal to initiate the cycling of the fastening tool 10 to install a fastener F to a workpiece.

The control unit 22 may include a power source sensor 52, a controller 54, a user presence sensor 56, an indicator (not shown), such as a light and/or a speaker, and a mode selector switch 60. The power source sensor 52 is configured to sense a condition in the power source 30 that is indicative of a level of kinetic energy of an element in the power source 30 and to generate a sensor signal in response thereto. For example, the power source sensor 52 may be operable for sensing a speed of the output shaft 32*a* of the motor 32 or of the flywheel 34. As one of ordinary skill in the art would appreciate from this disclosure, the power source sensor 52 may sense the characteristic directly or indirectly. For example, the speed of the motor output shaft 32*a* or flywheel 34 may be sensed directly, as through encoders, eddy current sensors or Hall Effect sensors, or indirectly, as through the back electromotive force ("back EMF") of the motor 32.

In the particular example provided, the power source sensor 52 includes three Hall Effect sensor cells (not shown) that are fixed relative to the housing 12 (FIG. 1) and are angularly spaced about one of the rotating components of the power source 30 (e.g., the rotor of the motor 32, the output shaft 32*a*, the flywheel 34, or the input 34*a*). A permanent magnet (not shown) can be fixedly mounted to that rotating component of the power source 30 (e.g., the rotor of the motor 32, the output shaft 32*a*, the flywheel 34, or the input 34*a*) such that each Hall Effect sensor cell senses the permanent magnet as it rotates past the respective Hall Effect sensor cell and can responsively generate a sensor signal that can be received by the controller 54. Thus, the controller 54 can determine the rotational speed of the flywheel 34 based on the sensor signals generated by the Hall Effect sensor cells.

In an alternative construction (not specifically shown), back EMF can be used to detect rotational speed of the flywheel 34. The back EMF is produced when the motor 32 is not powered by the battery 26 but rather driven by the speed and inertia of the components of the motor assembly 14 (especially the flywheel 34 in the example provided).

The user presence sensor 56 detects the presence of the user within the vicinity (e.g., a predetermined distance) of the fastening tool 10. In one example, the user presence sensor 56 is a contact sensor located on the handle 12*b*, and the user presence sensor 56 detects when the user grabs the handle 12*b*. In another example, the user presence sensor 56 is an accelerometer that detects when the fastening tool 10 is picked up by the user and/or in use. In another example, the user presence sensor 56 is a proximity sensor that detects when a device on the user's person is detected. The device may be a metal and/or magnetic object such as a bracelet or anklet. In another example, the sensor is a Bluetooth sensor that detects a Bluetooth/enabled device on the user's person.

In the particular example provided, the mode selector switch 60 is a two-position switch that permits the user to select either a sequential fire mode or a rapid sequential mode. In an alternative construction, the mode selector switch 60 can include additional positions for additional modes, such as a bump mode for example. The mode selector switch 60 may be a switch that produces a mode selector switch signal that is indicative of a desired mode of operation of the fastening tool 10. The controller 54 may be configured such that the fastening tool 10 will be operated in a given mode, such as the rapid sequential mode, only in response to the receipt of a specific signal from the mode selector switch 60. The placement of the mode selector switch 60 in a first position causes a signal of a predetermined first voltage to be applied to the controller 54, while the placement of the mode selector switch 60 in a second position causes a signal of a predetermined second voltage to be applied to the controller 54. Limits may be placed on the voltage of one or both of the first and second voltages, such as +−0.2V, so that if the voltage of one or both of the signals is outside the limits the controller 54 may default to a given firing mode (e.g., to the sequential firing mode) or operational condition (e.g., inoperative).

The controller 54 may be coupled to the mode selector switch 60, the trigger switch 18*a*, the contact trip switch 50, the motor 32, the power source sensor 52 and the actuator 44. In response to receipt of the trigger sensor signal and the contact trip sensor signal, the controller 54 determines whether the two signals have been generated at an appropriate time relative to the other (based on the mode selector switch 60 and the mode selector switch signal). If the order in which the trigger sensor signal and the contact trip sensor signal is not appropriate (i.e., not permitted based on the setting of the mode selector switch 60), the controller 54 does not enable electrical power to flow to the actuator 44. To reset the fastening tool 10, the user may be required to deactivate one or both of the trigger switch 18*a* and the contact trip switch 50 (e.g., release the trigger 18 and/or remove the contact trip 20 from the workpiece).

If the order in which the trigger sensor signal and the contact trip sensor signal is appropriate (i.e., permitted based on the setting of the mode selector switch 60 and the contact trip sensor signal being generated before the trigger sensor signal), the controller 54 enables electrical power to flow to the actuator 44, which causes the firing of the driver 28.

Sequential Mode

One mode of operation may be, for example, the sequential mode, wherein the contact trip 20 must first be abutted against a workpiece (so that the contact trip switch 50 generates the contact trip sensor signal) and thereafter (while the contact trip 20 is maintained in abutment with the workpiece) the trigger switch 18*a* is actuated to generate the trigger signal. In the sequential mode, the controller 54 operates the motor 32 to ramp the flywheel 34 up to a predetermined speed (e.g., a firing speed) when the contact trip 20 is actuated. The controller 54 can also be configured to operate the motor 32 to ramp the flywheel 34 up to the predetermined speed when the user interacts with the fastening tool 10 in another way that indicates a desire to use the fastening tool, such as actuating the trigger 18 for example. Operation in the sequential mode is described in greater detail below with reference to FIG. 3.

Figure 2:
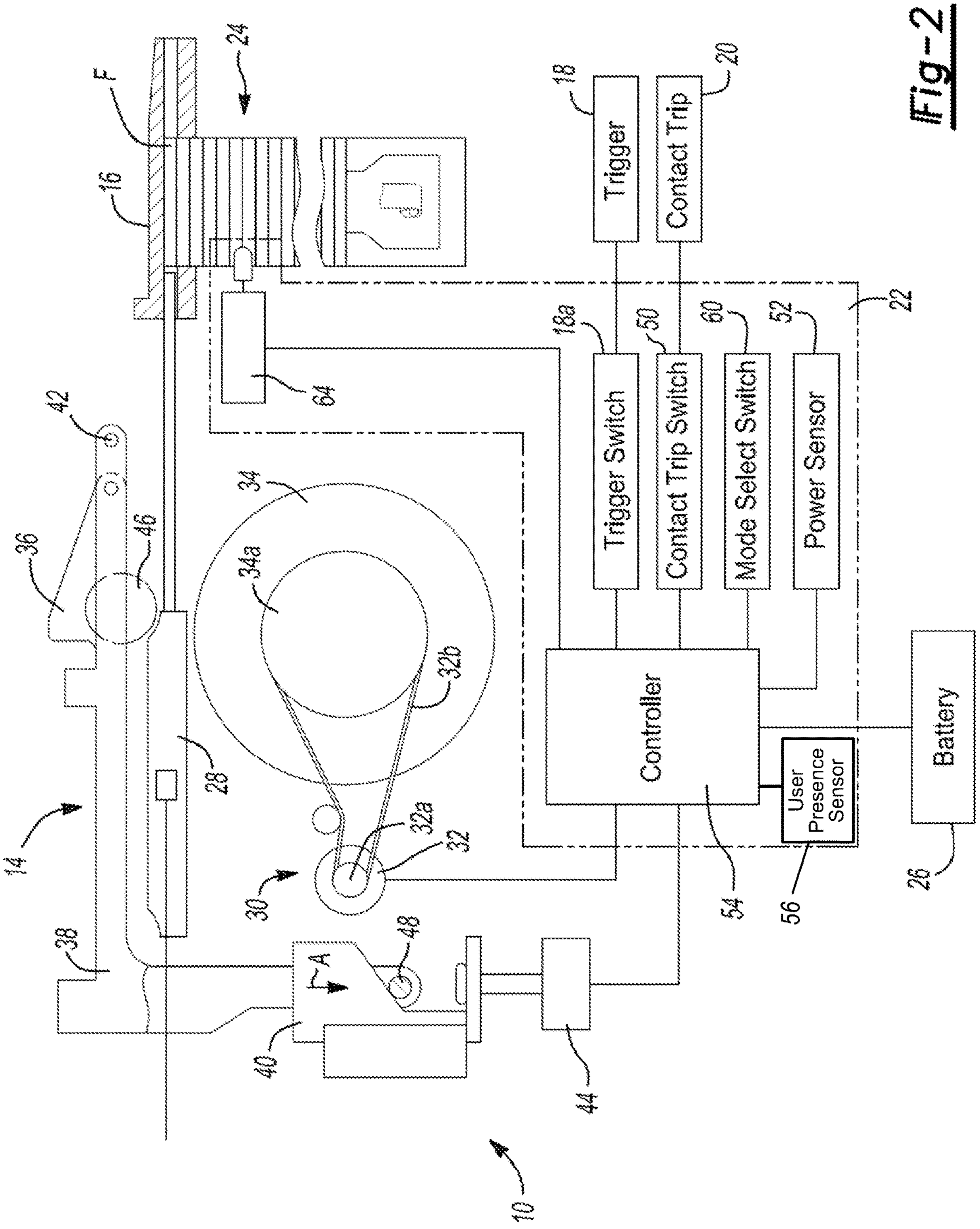
FIG. 2 is a schematic view of a portion of the fastening tool of FIG. 1 illustrating various components including the motor assembly and the controller.
Figure 3:
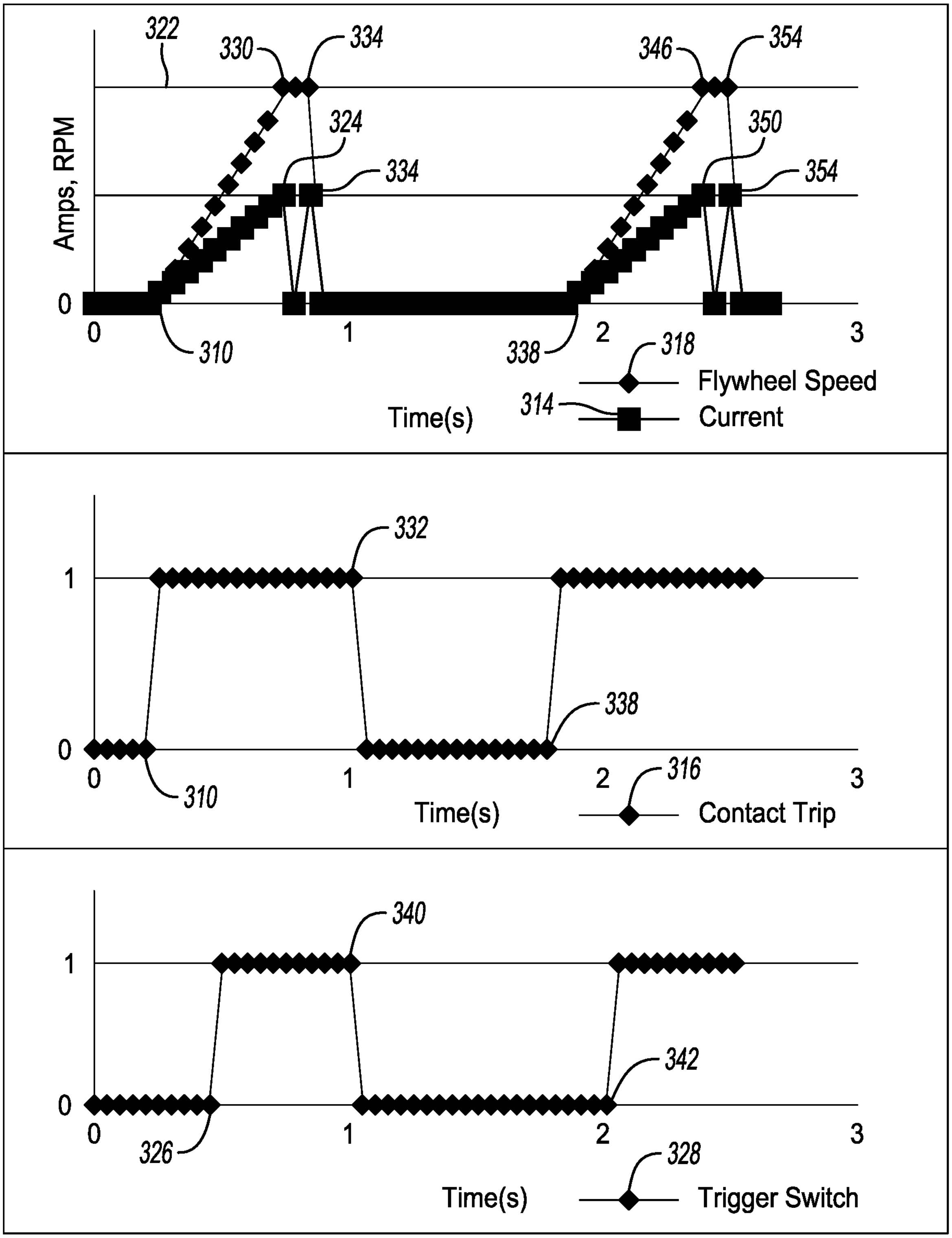
FIG. 3 is a plot illustrating the time-current values for a sequential mode of operation of the fastening tool of FIG. 1.

With continued reference to FIG. 2 and additional reference to FIG. 3, FIG. 3 illustrates a graphical timeline of an example firing sequence in the sequential mode. Line 314 can represent electrical current flowing from the battery 26 (e.g., via the controller 54), with a value of 0 representing when no current flows from the battery 26. Increased current (e.g., amps) is represented with increased vertical position. Line 318 can represent the rotational speed of the flywheel 34. Increased rotational speed (e.g., revolutions per minute) is represented with increased vertical position. Line 316 can represent the status of the contact trip switch 50, with a value of 0 representing an off status, and a value of 1 representing an actuated status. Line 328 can represent the status of the trigger switch 18*a*, with a value of 0 representing an off status, and a value of 1 representing an actuated status. The horizontal axes represent time in seconds.

At point 310, the contact trip switch 50 is actuated, and the controller 54 causes electrical current 314 to flow to the motor 32. In the example provided, the current 314 to the motor 32 increases over time at a steady rate causing the speed 318 at which the flywheel 34 rotates to increase at a steady rate. The speed 318 of the flywheel 34 can increase until reaching a first predetermined speed 322 (e.g., the firing speed). In the example provided, the first predetermined speed 322 is approximately 13,000 revolutions per minute, though other configurations can be used. In the example provided, the current 314 increases at a rate such that the flywheel 34 reaches the first predetermined speed 322 in approximately 0.5 seconds, though other configurations can be used. In the example provided, the controller 54 is configured to limit the maximum current output to the motor 32 to a predetermined current limit (e.g., 60 amps), though other configurations can be used. In the example provided, the current 314 increases at a rate such that the speed 318 of the flywheel 34 reaches the first predetermined speed 322 before the current 314 reaches the predetermined current limit.

In an alternative configuration, not specifically shown, the current 314 can rise at a faster rate, such that the current 314 reaches the predetermined current limit prior to the flywheel 34 reaching the first predetermined speed 322. In such a configuration, the current 314 can be applied at a constant magnitude at the predetermined current limit until the flywheel 34 reaches the first predetermined speed 322. Alternatively, the current 314 can repeatedly drop below the predetermined current limit and ramp back up to the predetermined current limit until the flywheel 34 reaches the first predetermined speed 322

Returning to the example provided, the first predetermined speed 322 can be sufficient to drive the driver 28 to fire the fastener F into the workpiece (not shown). When the flywheel 34 reaches the first predetermined speed 322, the current 314 to the motor 32 can be reduced or intermittently shut off to maintain the flywheel 34 at or above the first predetermined speed 322 until the kinetic energy of the flywheel 34 is needed for firing. In the example provided, the flywheel 34 reaches the first predetermined speed 322 at point 330 and the current 314 to the motor 32 is shut off at point 324.

In the example provided, the trigger switch 18*a* is actuated at point 326. In the example provided, the contact trip switch 50 is still actuated, the trigger switch 18*a* is actuated at point 326, the trigger switch 18*a* was actuated after the contact trip switch 50, and the flywheel 34 is at the first predetermined speed 322. Thus, the controller 54 activates the actuator 44 by providing electrical current 314 to the actuator 44 at point 334. Electrical current 314 can be applied to the actuator 44 in a pulse over a predetermined amount of time (e.g., approximately 30 milliseconds). At point 334, the actuator 44 can cause the driver 28 to engage the flywheel 34 to fire the fastener F, as described above.

In other words, the conditions required for firing the fastener in sequential mode can be: the contact trip switch 50 is currently actuated, the trigger switch 18*a* is currently actuated, the trigger switch 18*a* was actuated after the contact trip switch 50, and the speed 318 of the flywheel 34 is at the first predetermined speed 322. Thus, in the example provided, despite the trigger switch 18*a* being actuated at point 326, after point 310, the fastening tool 10 does not operate the actuator 44 to fire the fastener F until the flywheel 34 reaches the first predetermined speed 322 at point 330. In the example provided, electrical current 314 is not provided to the motor 32 while the actuator 44 is operated and is not provided while the driver 26 engages the flywheel 34.

While not specifically shown in FIG. 3, if the flywheel 34 reaches the first predetermined speed 322 before the trigger switch 18*a* is actuated, the current 314 can be reduced to maintain the speed 318 at the first predetermined speed 322 until the trigger switch 18*a* is actuated (e.g., to fire the fastener F), the contact trip switch 50 is no longer actuated (e.g., to turn off power to the motor 32), or for a predetermined amount of time (e.g., 10 seconds then turning off power to the motor 32), whichever occurs first.

After firing the fastener F, there is no current to the motor 32, and thus the speed 318 of the flywheel 34 reduces due to the transfer of kinetic energy to the driver 26. The magnitude of the reduction of speed 318 due to the firing of the fastener F can depend on the type of fastener F and/or the type of work piece (not shown) used. In the example provided, all of the kinetic energy of the flywheel 34 is lost in the firing process and the speed 318 returns to zero until the contact trip switch 50 is again actuated (e.g., at point 338). In an alternative configuration, actuation of the trigger switch 18*a* or another input by the user indicative of intent to use the fastening tool 10, subsequent to the firing can cause the controller 54 to provide power to the motor 32.

After firing the fastener F, the return mechanism (not shown) can cause the driver 26 to return to its original axial position, and a new fastener F can be positioned for subsequent firing.

In the example provided, the contact trip switch 50 is released at point 332 and the trigger switch 18*a* is released at point 340. The contact trip switch 50 is next actuated at point 338, causing the controller 54 to provide electric current 314 to the motor 32 and speed up the flywheel 34. When the contact trip switch 50 is actuated at point 338, the current 314 to the motor 32 is ramped up in a similar manner as when the contact trip switch 50 was actuated at point 310. The trigger switch 18*a* is next actuated at point 342, after point 338, but before the flywheel 34 has reached the first predetermined speed 322 at point 346. In the example provided, at point 350, the electric current 314 to the motor is turned off since the flywheel 34 has reached the predetermined speed 322. With the current 314 to the motor 32 off, a pulse of current 314 can flow to the actuator 44 point 354 to cause the driver 26 to engage the flywheel 34 at point 354. Thus, when in sequential mode, there is a delay of time between when firing is requested by the user (e.g., actuation of the trigger 18) and the subsequent firing of the fastener F, which must wait until the flywheel 34 reaches the first predetermined speed 322.

Rapid Sequential Mode

Another mode of operation may be the rapid sequential mode, wherein, similar to the sequential mode, the contact trip 20 must first be abutted against a workpiece and thereafter the trigger switch 18*a* is actuated to generate the trigger signal. After a shot is fired (e.g., a fastener F is driven from the nosepiece assembly 16), the motor 32 is operated to cause the flywheel 34 to ramp up to a second predetermined speed with no input from the user. The second predetermined speed can be the same as the first predetermined speed (e.g., the firing speed). As with the sequential mode, both the contact trip 20 and the trigger switch 18*a* must be released to enable the next firing sequence. When the contact trip 20 and the trigger switch 18*a* are actuated again (in that order only) then the next shot can be fired. In the example provided, the second predetermined speed is the firing speed and the second shot can be fired without delay. Operation in the rapid sequential mode is described in greater detail below with reference to FIG. 4.

In an alternative configuration of the rapid sequential mode, the second predetermined speed is less than the firing speed but greater than the reduced speed at which the flywheel 34 spins immediately after completing a firing sequence. In this alternative configuration, the second predetermined speed may be referred to as an idle speed, and the flywheel 34 can be ramped up from the idle speed to the firing speed after additional input by the user (e.g., actuation of the contact trip 20 or trigger switch 18*a*) with significantly less delay than if the flywheel 34 is needed to be ramped up from its reduced speed immediately after a firing sequence to the firing speed. In addition, the flywheel 34 may drive a fan, and spinning the flywheel 34 at the second predetermined speed after a firing sequence may cause the fan to blow air and thereby cool electrical components of the fastening tool 10.

Figure 4:
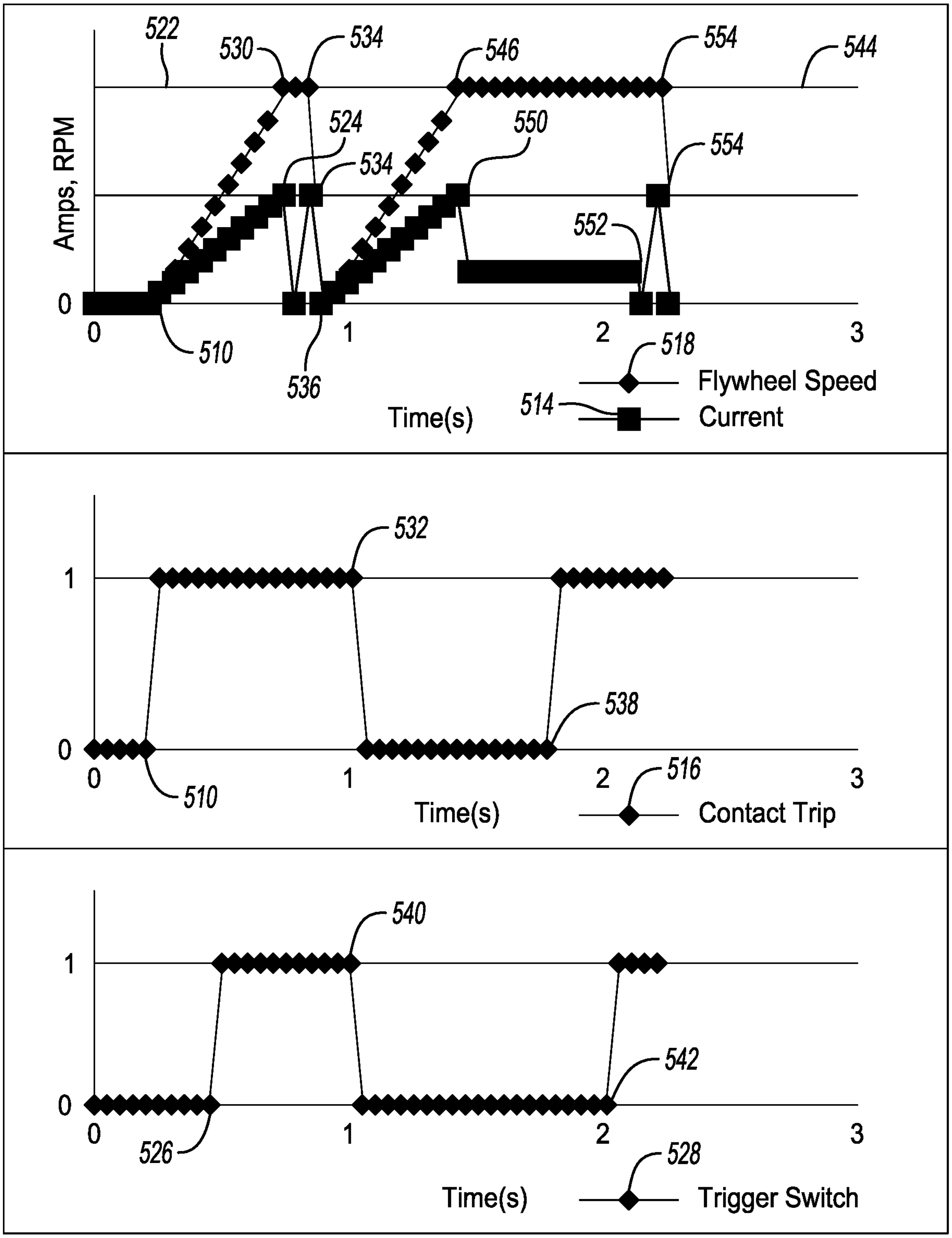
FIG. 4 is a plot illustrating the time-current values for a rapid sequential mode of operation of the fastening tool of FIG. 1.

With continued reference to FIG. 2, and additional reference to FIG. 4, FIG. 4 illustrates a graphical timeline of a firing sequence in the rapid sequential mode. Line 514 can represent electrical current flowing from the battery 26 (e.g., via the controller 54), with a value of 0 representing when no current flows from the battery 26. Increased current (e.g., amps) is represented with increased vertical position. Line 518 can represent the rotational speed of the flywheel 34. Increased rotational speed (e.g., revolutions per minute) is represented with increased vertical position. Line 516 can represent the status of the contact trip switch 50, with a value of 0 representing an off status, and a value of 1 representing an actuated status. Line 528 can represent the status of the trigger switch 18*a*, with a value of 0 representing an off status, and a value of 1 representing an actuated status. The horizontal axes represent time in seconds.

At point 510, the contact trip switch 50 is actuated, causing electrical current 514 to flow to the motor 32. In the example provided, the current 514 to the motor 32 increases over time at a steady rate causing the speed 518 at which the flywheel 34 rotates to increase at a steady rate. The speed 518 of the flywheel 34 can increase until reaching a first predetermined speed 522 (e.g., the firing speed). The first predetermined speed 522 may be referred to as a target speed S2. In the example provided, the first predetermined speed 522 is approximately 13,000 revolutions per minute, though other configurations can be used. In the example provided, the current 514 increases at a rate such that the flywheel 34 reaches the first predetermined speed 522 in approximately 0.5 seconds, though other configurations can be used. In the example provided, the controller 54 is configured to limit the maximum current output to the motor 32 to a predetermined current limit (e.g., 60 amps), though other configurations can be used. In the example provided, the current 514 increases at a rate such that the speed 518 of the flywheel 34 reaches the first predetermined speed 522 before the current 514 reaches the predetermined current limit.

In an alternative configuration, not specifically shown, the current 514 can rise at a faster rate, such that the current 514 reaches the predetermined current limit prior to the flywheel 34 reaching the first predetermined speed 522. In such a configuration, the current 514 can be applied at a constant magnitude at the predetermined current limit until the flywheel 34 reaches the first predetermined speed 522. Alternatively, the current 514 can repeatedly drop below the predetermined current limit and ramp back up to the predetermined current limit until the flywheel 34 reaches the first predetermined speed 522.

Returning to the example provided, the first predetermined speed 522 can be sufficient to drive the driver 28 to fire the fastener F into the workpiece (not shown). When the flywheel 34 reaches the first predetermined speed 522, the current 514 to the motor 32 can be reduced or intermittently shut off to maintain the flywheel 34 at or above the first predetermined speed 522 until the kinetic energy of the flywheel 34 is needed for firing. In the example provided, the flywheel 34 reaches the first predetermined speed 522 at point 530 and the current 514 to the motor 32 is shut off at point 524.

In the example provided, the trigger switch 18*a* is actuated at point 526. In the example provided, the contact trip switch 50 is still actuated, the trigger switch 18*a* is actuated at point 526, the trigger switch 18*a* was actuated after the contact trip switch 50, and the flywheel 34 is at the first predetermined speed 522. Thus, the controller 54 activates the actuator 44 by providing electrical current 514 to the actuator 44 at point 534. Electrical current 514 can be applied to the actuator 44 in a pulse over a predetermined amount of time (e.g., approximately 30 milliseconds). At point 534, the actuator 44 can cause the driver 28 to engage the flywheel 34 to fire the fastener F, as described above.

In other words, the conditions required for firing the fastener in rapid sequential mode can be the same as those for firing in the sequential mode: the contact trip 20 is currently actuated, the trigger switch 18*a* is currently actuated, the trigger 18 was actuated after the contact trip switch 50, and the speed 518 of the flywheel 34 is at the first predetermined speed 522. Thus, in the example provided, despite the trigger switch 18*a* being actuated at point 526, after point 310, the fastening tool 10 does not operate the actuator 44 to fire the fastener F until the flywheel 34 reaches the first predetermined speed 522 at point 530. In the example provided, electrical current 514 is not provided to the motor 32 while the actuator 44 is operated and is not provided while the driver 26 engages the flywheel 34.

While not specifically shown in FIG. 4, if the flywheel 34 reaches the first predetermined speed 522 before the trigger switch 18*a* is actuated, the current 514 can be reduced to maintain the speed 518 at the first predetermined speed 522 until the trigger switch 18*a* is actuated (e.g., to fire the fastener F), the contact trip switch 50 is no longer actuated (e.g., to turn off power to the motor 32), or for a predetermined amount of time (e.g., 10 seconds then turning off power to the motor 32), whichever occurs first.

After firing the fastener F, the return mechanism (not shown) can cause the driver 26 to return to its original axial position, and a new fastener F can be positioned for subsequent firing.

After providing current 514 to the actuator 44 to fire the fastener F, the controller 54 can wait a predetermined amount of time (e.g., 30 milliseconds) to allow the driver 26 to disengage the flywheel 34. After the predetermined amount of time set to allow the driver 26 to disengage the flywheel 34 (e.g., at point 536) the controller 54 can cause current 514 to flow to the motor 32 to increase the speed 518 of the flywheel 34 until the flywheel 34 reaches a second predetermined speed 544, without additional input from the user. The second predetermined speed 544 may be referred to as a target speed S1. In the example provided, the second predetermined speed 544 is equal to the first predetermined speed 522, though other configurations can be used. In one such alternative configuration, the second predetermined speed 544 is less than the first predetermined speed 522, but greater than the speed of the flywheel 34 immediately after firing a fastener F.

In the example provided, the current 514 to the motor 32 is ramped up to point 550 in a similar manner as when the contact trip switch 50 was actuated at point 510. At point 546, the speed 518 of the flywheel 34 reaches the second predetermined speed 544.

In the example provided, once the controller 54 detects that the flywheel 34 is rotating at the second predetermined speed 544, the controller 54 maintains a reduced amount of current 514, greater than zero (e.g., 3 amps), to the motor 32 to maintain the flywheel 34 at the second predetermined speed 544. The controller 54 maintains the flywheel 34 at the second predetermined speed 544 for a predetermined amount of time after the preceding firing of the fastener F. While not specifically shown in FIG. 4, following the predetermined amount of time of maintaining the second predetermined speed 544, the controller 54 stops current from flowing to the motor 32 and the flywheel 34 is permitted to come to a rest until another input from the user (e.g., actuation of the contact trip 20 or the trigger 18) causes the controller 54 to again provide current 514 to the motor 32.

In the example provided, the contact trip switch 50 is released at point 532 and the trigger switch 18*a* is released at point 540. The contact trip switch 50 is next actuated at point 538. The trigger switch 18*a* is next actuated at point 542, after point 538 (i.e., after actuation of the contact trip switch 50). Unlike the sequential mode, since the flywheel 34 is already at second predetermined speed 544, there is no delay of time between when firing is requested by the user (e.g., actuation of the trigger switch 18*a*) and the subsequent firing of the fastener F. Thus, since all the conditions for firing the fastener F are met, the fastener F can be fired. At point 552, the controller 54 turns off power to the motor 32 and at point 554, provides current 514 to the actuator 44 to cause the driver 26 to engage the flywheel 34 at point 554 and fire the fastener F.

Multiple-Timeout Sequential Mode

Figure 5:
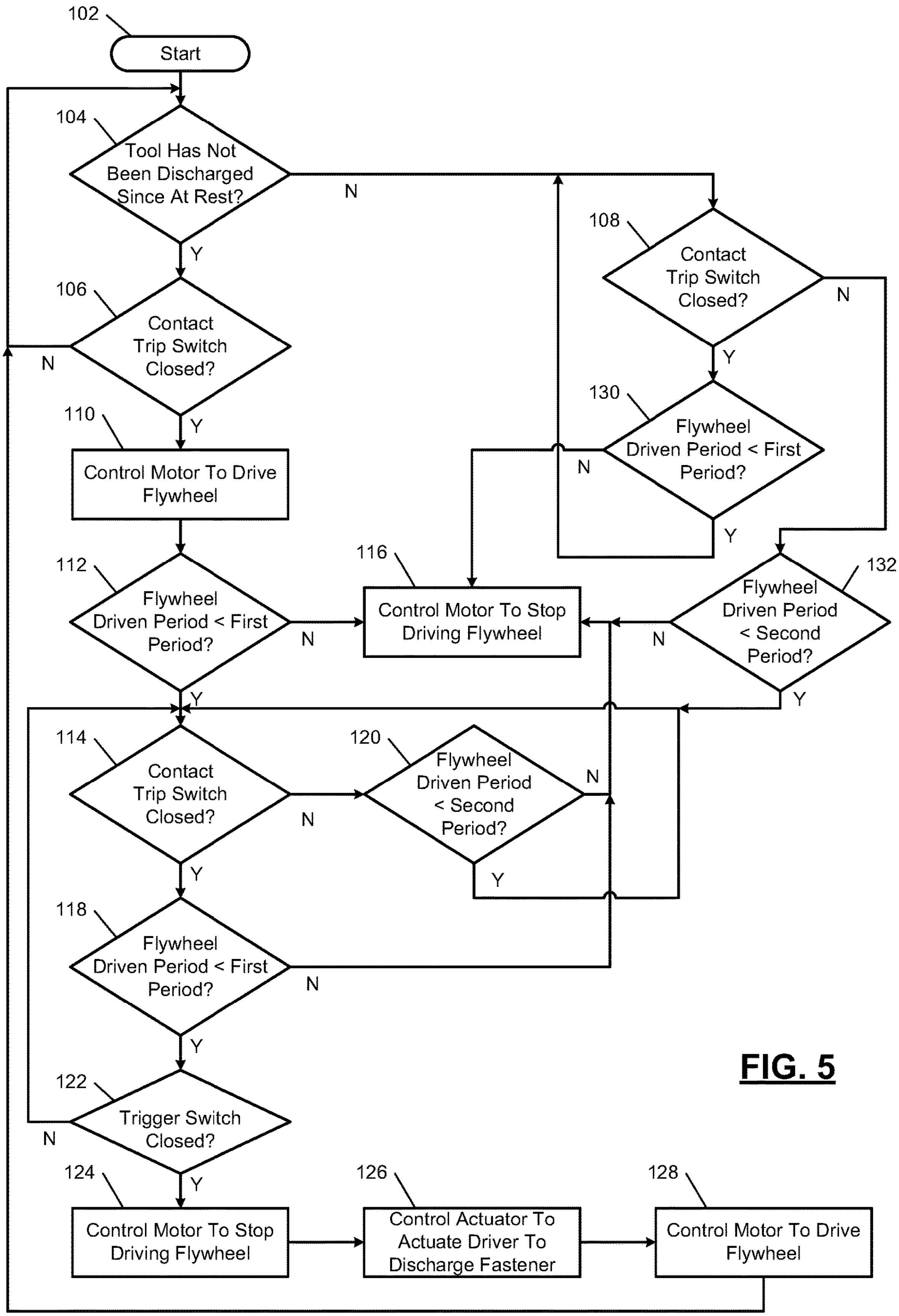
FIG. 5 is a flow chart showing the flywheel timeout in multiple-timeout sequential mode when the contact trip switch is closed first and then the trigger switch is closed in accordance with the present invention.

With continued reference to FIG. 2 and additional reference to FIG. 5, the controller 54 may also operate in a multiple-timeout sequential mode. When operating in a sequential mode, after the fastening tool 10 has fired, the controller 54 may confirm that both the contact trip switch 50 and the trigger switch 18*a* have been cycled (i.e., opened and closed within a brief period) before initiating another firing of the fastening tool 10. When operating in a multiple-timeout sequential mode, the controller 54 uses more than one timeout period (i.e., two or more timeout periods) for determining when to control the motor 32 to stop driving the flywheel 34. The controller 54 may operate in the multiple-timeout sequential mode shown in FIG. 5 when the trigger switch 18*a* is closed first and then the contact trip switch 50 is closed.

The method executed by the controller 54 when operating in the multiple-timeout sequential mode shown in FIG. 5 begins at step 102. At step 104, the controller 54 confirms that the fastening tool 10 has not discharged (fired) a fastener since the fastening tool 10 was last at rest (e.g., powered off, the flywheel 34 not spinning). If the fastening tool 10 has not discharged a fastener, the method continues at step 106. Otherwise, the method continues at step 108.

At step 106, the controller 54 determines whether the contact trip switch 50 is closed. If the contact trip switch 50 is closed, the method continues at step 110. Otherwise, the method returns to step 104. At step 110, the controller 54 controls the motor 32 to drive the flywheel 34. For example, the controller 54 may control the motor 32 to increase the speed of the flywheel 34 to the target speed S1. The controller 54 may control the motor 32 to drive the flywheel 34 by supplying current to the motor 32.

At step 112, the controller 54 determines whether the period for which the flywheel 34 has been continuously driven is less than a first period (e.g., 4 seconds), which may be predetermined. If the flywheel driven period is less than the first period, the method continues at step 114. Otherwise, the method continues at step 116.

At step 116, the controller 54 controls the motor 32 to stop driving the flywheel 34 and thereby ends the flywheel driven period, which may be referred to as a timeout. Therefore, the first period is one timeout period for determining when to control the motor 32 to stop driving the flywheel 34. The controller 54 may control the motor 32 to stop driving the flywheel 34 by no longer supplying current to the motor 32.

At step 114, the controller 54 determines whether the contact trip switch 50 is closed. If the contact trip switch 50 is closed, the method continues at step 118. Otherwise, the method continues at step 120.

At step 120, the controller 54 determines whether the period for which the flywheel 34 has been continuously driven is less than a second period (e.g., a period within a range from 10 to 60 seconds), which may be predetermined. The duration of the second period may be equal to or different than (e.g., greater than) the duration of the first period. If the flywheel driven period is less than the second period, the method returns to step 114. Otherwise, the method continues at step 116 and a timeout occurs. Therefore, the second period is another timeout period for determining when to control the motor 32 to stop driving the flywheel 34. The controller 54 may control the motor 32 to adjust the speed of the flywheel 34 to the target speed S1 for the entire duration of the first and second periods.

At step 118, the controller 54 determines whether the period for which the flywheel 34 has been continuously driven is less than the first period. If the flywheel driven period is less than the first period, the method continues at step 122. Otherwise, the method continues at step 116 and a timeout occurs.

At step 122, controller 54 determines whether the whether the trigger switch 18*a* is closed. If the trigger switch 18*a* is closed, the method continues at step 124. Otherwise, the method returns to step 114.

At step 124, the controller 54 controls the motor 32 to stop driving the flywheel 34. At step 126, the controller 54 controls the actuator 44 to engage the driver 28 with the flywheel 34, and thereby actuate the driver 28 to drive the fastener F into the workpiece. Thus, the controller 54 confirms that both the trigger switch 18*a* and the contact trip switch 50 are closed before executing a discharge of the fastening tool 10. If the target speed S1 is different than (e.g., less than) the target speed S2 (e.g., the firing speed), the controller 54 may control the motor 32 to adjust the speed of the flywheel 34 to the target speed S2 before controlling the actuator 44 to engage the driver 28 with the flywheel 34.

At step 128, the controller 54 controls the motor 32 to drive the flywheel 34 once again. For example, the controller 54 may control the motor 32 to increase the speed of the flywheel 34 to the target speed S1. The controller 54 may control the motor 32 to drive the flywheel 34 at step 128 regardless of whether the contact trip switch 50 or the trigger switch 18*a* is closed. The method then returns to step 104.

Since the fastening tool 10 has now discharged a fastener since the fastening tool 10 was last at rest, the method continues at step 108 from step 104. At step 108, the controller 54 determines whether the contact trip switch 50 is closed. If the contact trip switch 50 is closed, the method continues at step 130. Otherwise, the method continues at step 132.

At step 130, the controller 54 determines whether the period for which the flywheel 34 has been continuously driven is less than the first period. If the flywheel driven period is less than the first period, the method returns to step 108. Otherwise, the method continues at step 116 and a timeout occurs. In this way, the controller 54 confirms that the contact trip switch 50 is opened after a discharge before initiating another discharge to prevent "drag fire." In this regard, the first period may be referred to as a safety timeout period.

At step 132, the controller 54 determines whether the period for which the flywheel 34 has been continuously driven is less than the second period. If the flywheel driven period is less than the second period, the method continues at step 114. Otherwise, the method continues at step 116 and a timeout occurs. Thus, the second period is a timeout period for determining how long to maintain the flywheel 34 at the target speed S1 (e.g., the firing speed) regardless of whether the contact trip switch 50 has been opened. In this regard, the second period may be referred to as a ready-to-fire timeout period.

Figure 6:
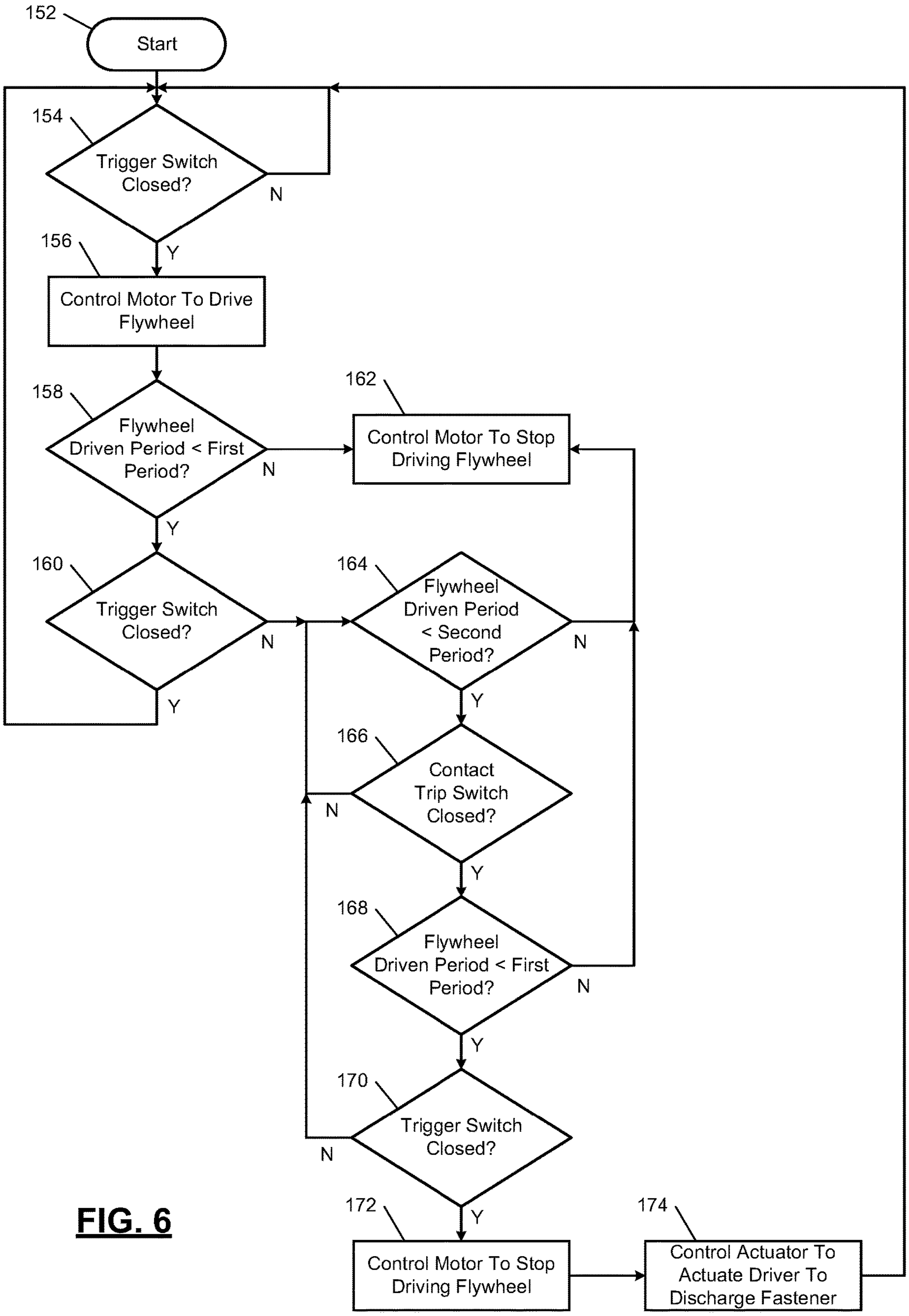
FIG. 6 is a flow chart showing the flywheel timeout in multiple-timeout sequential mode when the trigger switch is closed first and then the contact trip switch is closed in accordance with the present invention.

With continued reference to FIG. 2 and additional reference to FIG. 6, the controller 54 may operate in another multiple-timeout sequential mode. The controller 54 may operate in the multiple-timeout sequential mode shown in FIG. 6 when the contact trip switch 50 is closed first and then the trigger switch 18*a* is closed. The method executed by the controller 54 when operating in the multiple-timeout sequential mode shown in FIG. 6 begins at step 152.

At step 154, the controller 54 determines whether the trigger switch 18*a* is closed. If the trigger switch 18*a* is closed, the method continues at step 156. Otherwise, the method remains at step 154. At step 156, the controller 54 controls the motor 32 to drive the flywheel 34. For example, the controller 54 may control the motor 32 to increase the speed of the flywheel 34 to the target speed S1.

At step 158, the controller 54 determines whether the period for which the flywheel 34 has been continuously driven is less than the first period. If the flywheel driven period is less than the first period, the method continues at step 160. Otherwise, the method continues at step 162. At step 162, the controller 54 controls the motor 32 to stop driving the flywheel 34 and thereby ends the flywheel driven period which, as noted above, may be referred to as a timeout. Therefore, the first period is one timeout period for determining when to control the motor 32 to stop driving the flywheel 34.

At step 160, the controller 54 determines whether the trigger switch 18*a* is closed. If the trigger switch 18*a* is closed, the method returns to step 154. Otherwise, the method continues at step 164. In this way, the controller 54 confirms that the trigger switch 18*a* is cycled after a discharge before initiating another discharge.

At step 164, the controller 54 determines whether the period for which the flywheel 34 has been continuously driven is less than the second period. If the flywheel driven period is less than the second period, the method continues at step 166. Otherwise, the method continues at step 162 and a timeout occurs. Therefore, the second period is another timeout period for determining when to control the motor 32 to stop driving the flywheel 34.

At step 166, controller 54 determines whether the whether the contact trip switch 50 is closed. If the contact trip switch 50 is closed, the method continues at step 168. Otherwise, the method returns to step 164.

At step 168, the controller 54 determines whether the period for which the flywheel 34 has been continuously driven is less than the first period. If the flywheel driven period is less than the first period, the method continues at step 170. Otherwise, the method continues at step 162 and a timeout occurs.

At step 170, controller 54 determines whether the whether the trigger switch 18*a* is closed. If the trigger switch 18*a* is closed, the method continues at step 172. Otherwise, the method returns to step 164.

At step 172, the controller 54 controls the motor 32 to stop driving the flywheel 34. At step 174, the controller 54 controls the actuator 44 to engage the driver 28 with the flywheel 34, and thereby actuate the driver 28 to drive the fastener F into the workpiece. If the target speed S1 is different than (e.g., less than) the target speed S2 (e.g., the firing speed), the controller 54 may control the motor 32 to adjust the speed of the flywheel 34 to the target speed S2 before controlling the actuator 44 to engage the driver 28 with the flywheel 34. After step 174, the method returns to step 154. In various implementations, the controller 54 may control the motor 32 to drive the flywheel 34 after step 174 and before step 154 regardless of whether the contact trip switch 50 or the trigger switch 18*a* is closed. In these implementations, the controller 54 may simply continue controlling the motor 32 to drive the flywheel 34 at step 156.

At step 128, the controller 54 controls the motor 32 to drive the flywheel 34 once again. For example, the controller 54 may control the motor 32 to increase the speed of the flywheel 34 to the target speed S1. The controller 54 may control the motor 32 to drive the flywheel 34 at step 128 regardless of whether the contact trip switch 50 or the trigger switch 18*a* is closed.

Bump Mode

Figure 7:
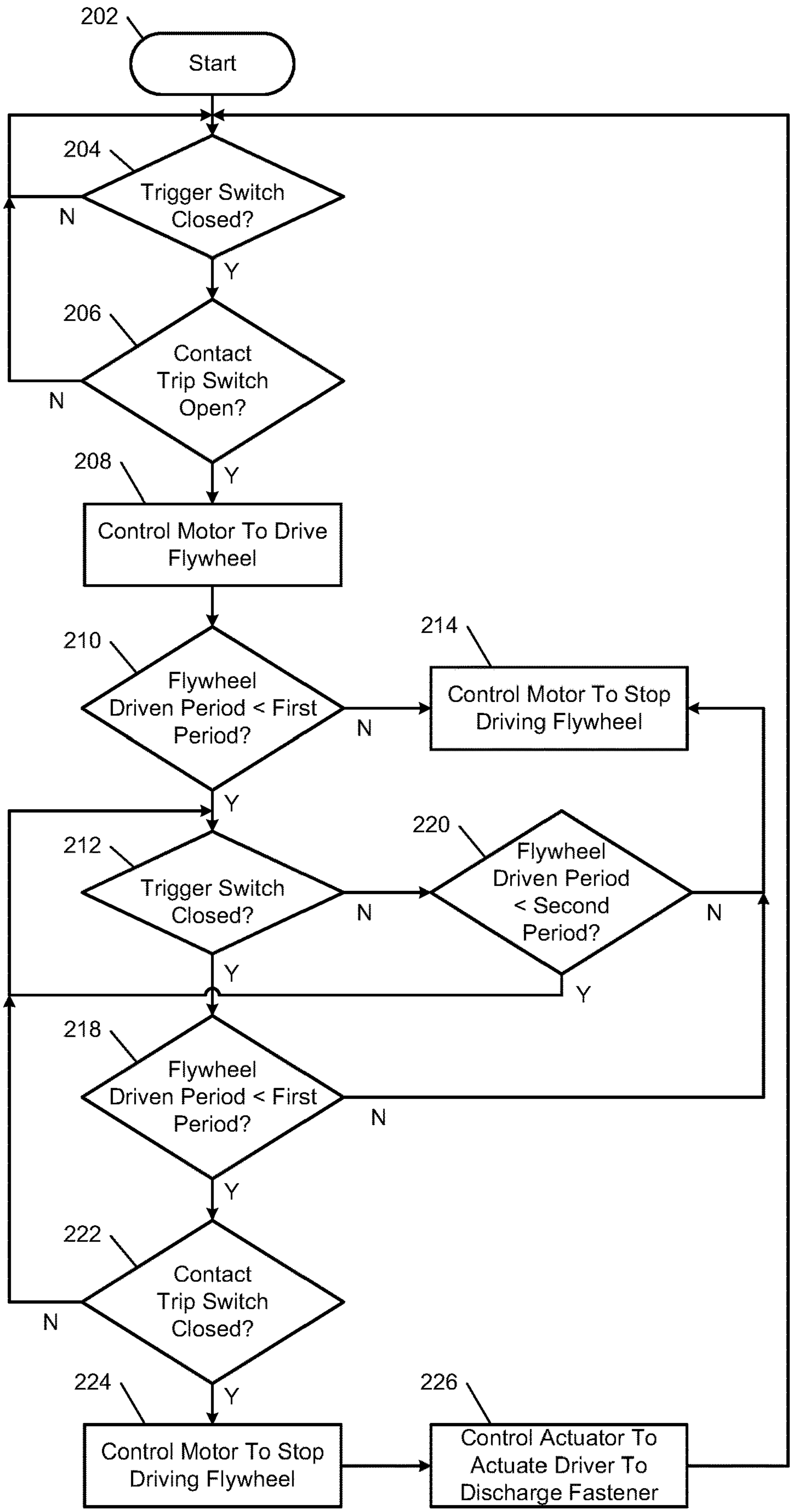
FIG. 7 is a flow chart showing the flywheel timeout in bump mode when the trigger switch is closed first and then the contact trip switch is closed in accordance with the present invention.

With continued reference to FIG. 2 and additional reference to FIG. 7, the controller 54 may also operate in a bump mode. When operating in a bump mode, after the fastening tool 10 has fired, the controller 54 may confirm that the contact trip switch 50 has been cycled and may not confirm that the trigger switch 18*a* has been cycled before initiating another firing of the fastening tool 10. The controller 54 may operate in the bump mode shown in FIG. 7 when the trigger switch 18*a* is closed first and then the contact trip switch 50 is closed. The method executed by the controller 54 when operating in the bump mode shown in FIG. 7 begins at step 202.

At step 204, the controller 54 determines whether the trigger switch 18*a* is closed. If the trigger switch 18*a* is closed, the method continues at step 206. Otherwise, the method remains at step 204. At step 206, the controller 54 determines whether the contact trip switch 50 is open. If the contact trip switch 50 is open, the method continues at step 208. Otherwise, the method returns to step 204.

At step 208, the controller 54 controls the motor 32 to drive the flywheel 34. For example, the controller 54 may control the motor 32 to increase the speed of the flywheel 34 to the target speed S1. At step 210, the controller 54 determines whether the period for which the flywheel 34 has been continuously driven is less than the first period. If the flywheel driven period is less than the first period, the method continues at step 212. Otherwise, the method continues at step 214. At step 214, the controller 54 controls the motor 32 to stop driving the flywheel 34 and thereby executes a timeout.

At step 212, the controller 54 determines whether the trigger switch 18*a* is closed. If the trigger switch 18*a* is closed, the method continues at step 218. Otherwise, the method continues at step 220.

At step 220, the controller 54 determines whether the period for which the flywheel 34 has been continuously driven is less than the second period. If the flywheel driven period is less than the second period, the method returns to step 212. Otherwise, the method continues at step 214 and a timeout occurs.

At step 218, the controller 54 determines whether the period for which the flywheel 34 has been continuously driven is less than the first period. If the flywheel driven period is less than the first period, the method continues at step 222. Otherwise, the method continues at step 214 and a timeout occurs.

At step 222, controller 54 determines whether the whether the contact trip switch 50 is closed. If the contact trip switch 50 is closed, the method continues at step 224. Otherwise, the method returns to step 212.

At step 224, the controller 54 controls the motor 32 to stop driving the flywheel 34. At step 226, the controller 54 controls the actuator 44 to engage the driver 28 with the flywheel 34, and thereby actuate the driver 28 to drive the fastener F into the workpiece. If the target speed S1 is different than (e.g., less than) the target speed S2 (e.g., the firing speed), the controller 54 may control the motor 32 to adjust the speed of the flywheel 34 to the target speed S2 before controlling the actuator 44 to engage the driver 28 with the flywheel 34. After step 226, the method returns to step 204. In various implementations, the controller 54 may control the motor 32 to drive the flywheel 34 after step 226 and before step 204 regardless of whether the contact trip switch 50 or the trigger switch 18*a* is closed. In these implementations, the controller 54 may simply continue controlling the motor 32 to drive the flywheel 34 at step 208.

Figure 8:
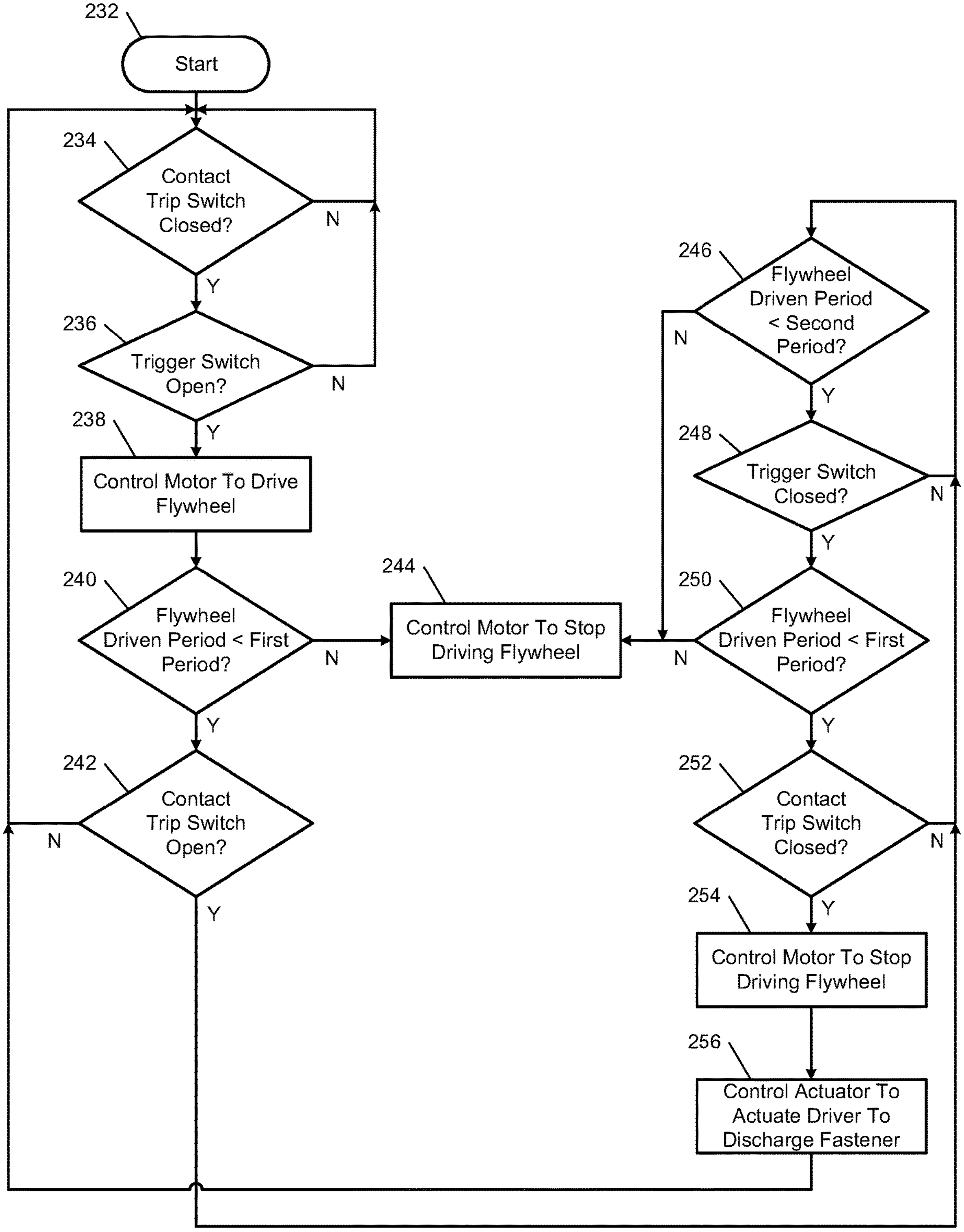
FIG. 8 is a flow chart showing the flywheel timeout in bump mode when the contact trip switch is closed first and then the trigger switch is closed in accordance with the present invention.

With continued reference to FIG. 2 and additional reference to FIG. 8, the controller 54 may operate in another bump mode. The controller 54 may operate in the bump mode shown in FIG. 8 when the contact trip switch 50 is closed first and then the trigger switch 18*a* is closed. The method executed by the controller 54 when operating in the bump mode shown in FIG. 8 begins at step 232.

At step 234, the controller 54 determines whether the contact trip switch 50 is closed. If the contact trip switch 50 is closed, the method continues at step 236. Otherwise, the method remains at step 234.

At step 236, the controller 54 determines whether the trigger switch 18*a* is open. If the trigger switch 18*a* is open, the method continues at step 238. Otherwise, the method returns to step 234.

At step 238, the controller 54 controls the motor 32 to drive the flywheel 34. For example, the controller 54 may control the motor 32 to increase the speed of the flywheel 34 to the target speed S1. At step 240, the controller 54 determines whether the period for which the flywheel 34 has been continuously driven is less than the first period. If the flywheel driven period is less than the first period, the method continues at step 242. Otherwise, the method continues at step 244. At step 244, the controller 54 controls the motor 32 to stop driving the flywheel 34 and thereby executes a timeout.

At step 242, the controller 54 determines whether the contact trip switch 50 is open. If the contact trip switch 50 is open, the method continues at step 246. Otherwise, the method returns to step 234 and, if the contact trip switch 50 remains closed for at least the first period, the method eventually continues at step 244 and a timeout occurs. In this way, the controller 54 confirms that the contact trip switch 50 is opened after a discharge before initiating another discharge to prevent "drag fire."

At step 246, the controller 54 determines whether the period for which the flywheel 34 has been continuously driven is less than the second period. If the flywheel driven period is less than the second period, the method continues at step 248. Otherwise, the method continues at step 244 and a timeout occurs.

At step 248, the controller 54 determines whether the trigger switch 18*a* is closed. If the trigger switch 18*a* is closed, the method continues at step 250. Otherwise, the method returns to step 246.

At step 250, the controller 54 determines whether the period for which the flywheel 34 has been continuously driven is less than the first period. If the flywheel driven period is less than the first period, the method continues at step 252. Otherwise, the method continues at step 244 and a timeout occurs.

At step 252, controller 54 determines whether the whether the contact trip switch 50 is closed. If the contact trip switch 50 is closed, the method continues at step 254. Otherwise, the method returns to step 246.

At step 254, the controller 54 controls the motor 32 to stop driving the flywheel 34. At step 256, the controller 54 controls the actuator 44 to engage the driver 28 with the flywheel 34, and thereby actuate the driver 28 to drive the fastener F into the workpiece. If the target speed S1 is different than (e.g., less than) the target speed S2 (e.g., the firing speed), the controller 54 may control the motor 32 to adjust the speed of the flywheel 34 to the target speed S2 before controlling the actuator 44 to engage the driver 28 with the flywheel 34. After step 256, the method returns to step 234. In various implementations, the controller 54 may control the motor 32 to drive the flywheel 34 after step 256 and before step 234 regardless of whether the contact trip switch 50 or the trigger switch 18*a* is closed. In these implementations, the controller 54 may simply continue controlling the motor 32 to drive the flywheel 34 at step 238.

In summary of some possible aspects of FIGS. 5 through 8, driving the flywheel 34 for the duration of the second period at steps 120 and 132 of FIG. 5, step 164 of FIG. 6, step 220 of FIG. 7, and step 246 of FIG. 8 is initiated by any one of the following scenarios:

I. Cycling of the trigger switch 18*a* at step 154 of FIG. 6 or step 204 of FIG. 7;
II. Cycling of the contact trip switch 50 at step 106 of FIG. 5 or step 234 of FIG. 8; and
III. A fastener discharge (e.g., nail firing) event at step 126 of FIG. 5, step 174 of FIG. 6, step 226 of FIG. 7, or step 256 of FIG. 8.

Driving the flywheel 34 for the duration of the first period at step 112 of FIG. 5, step 158 of FIG. 6, step 210 of FIG. 7, and step 240 of FIG. 8 is initiated by any one of the following scenarios:

I. If the trigger switch 18*a* is held closed at step 122 of FIG. 5, step 154 of FIG. 6, steps 204 or 212 of FIG. 7, or step 248 of FIG. 8 for at least the first period at steps 112, 118, or 130 of FIG. 5, steps 158 or 168 of FIG. 6, steps 210 or 218 of FIG. 7, or steps 240 or 250 of FIG. 8, then a timeout occurs and the flywheel 34 is no longer driven;
II. If the contact trip switch 50 is held closed at steps 106 or 114 of FIG. 5, step 166 of FIG. 6, step 222 of FIG. 7, or steps 234 or 252 of FIG. 8 for at least the first period at steps 112, 118, or 130 of FIG. 5, steps 158 or 168 of FIG. 6, steps 210 or 218 of FIG. 7, or steps 240 or 250 of FIG. 8, then a timeout occurs and the flywheel 34 is no longer driven; and
III. If the trigger switch 18*a* and the contact trip switch 50 are held closed at steps 122 and 106 or 114 of FIG. 5, steps 154 and 158 or 168 of FIG. 6, steps 222 and 204 or 212 of FIG. 7, steps 248 and 234 or 2252 of FIG. 8 for at least the first period at steps 112, 118, or 130 of FIG. 5, steps 158 or 168 of FIG. 6, steps 210 or 218 of FIG. 7, or steps 240 or 250 of FIG. 8, then a timeout occurs and the flywheel 34 is no longer driven.

A fastener (e.g., a nail) is fired if both the contact trip switch 50 and the trigger switch 18*a* are closed in any one of the following combinations:

I. The contact trip switch 50 is closed first at step 114 of FIG. 5 or step 166 of FIG. 6 and then the trigger switch 18*a* is closed at step 122 of FIG. 5 or step 170 of FIG. 6;
II. The trigger switch 18*a* is closed first at step 212 of FIG. 7 or step 248 of FIG. 8 and then the contact trip switch 50 is closed at step 222 of FIG. 7 or step 252 of FIG. 8; and
III. The trigger switch 18*a* is held closed at step 212 of FIG. 7 or step 248 of FIG. 8 and then the contact trip switch 50 is cycled at step 222 of FIG. 7 or step 252 of FIG. 8.

Figure 9:
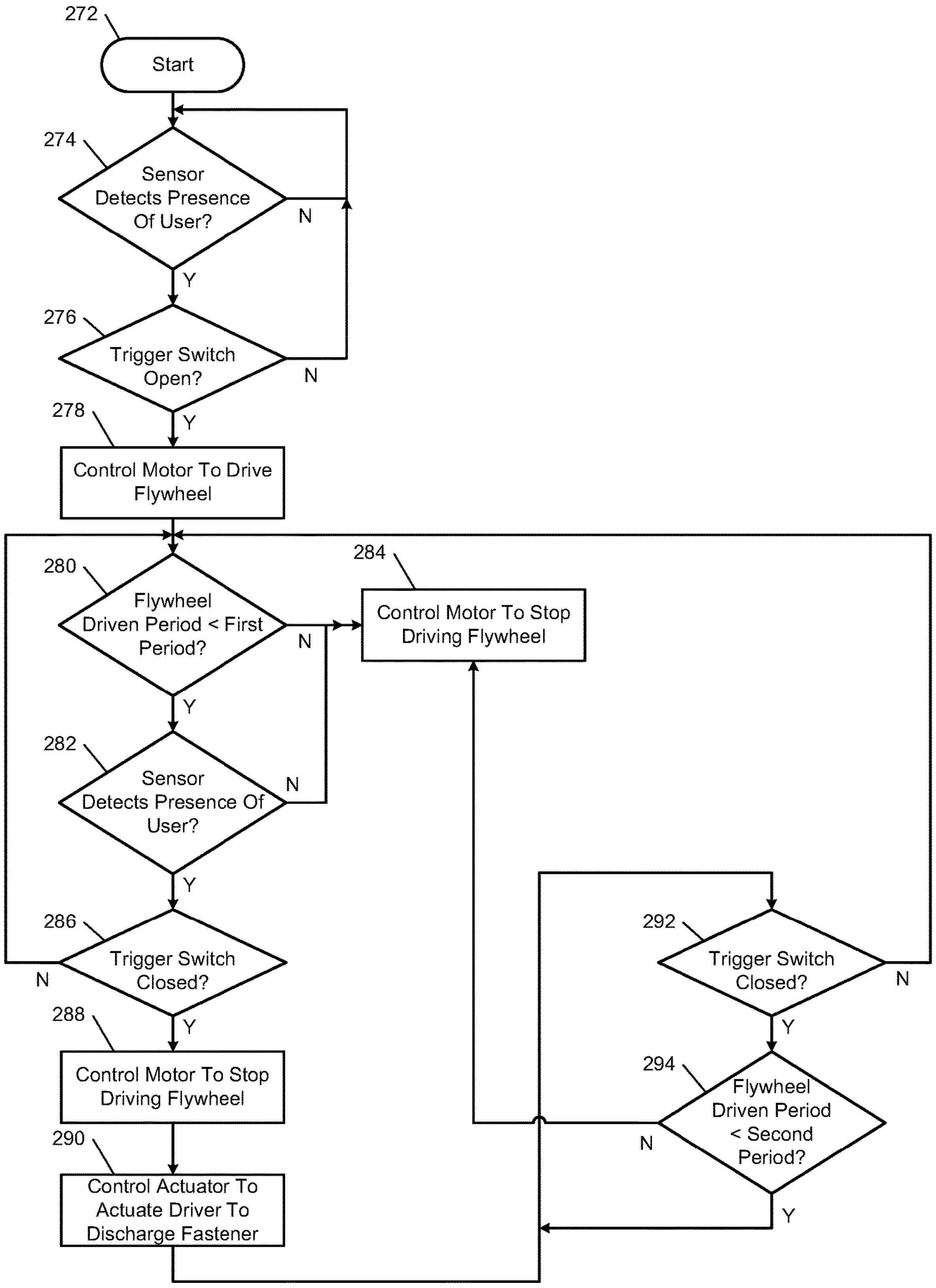
FIG. 9 is a flow chart showing the flywheel timeout in bump mode when a sensor on the fastening tool detects the presence of a user first and then the trigger switch is closed in accordance with the present invention.

With continued reference to FIG. 2 and additional reference to FIG. 9, the controller 54 may operate in yet another bump mode. The controller 54 may operate in the bump mode shown in FIG. 9 when the user presence sensor 56 detects the presence of a user and then the trigger switch 18*a* is closed. The method executed by the controller 54 when operating in the bump mode shown in FIG. 9 begins at step 272.

At step 274, controller 54 determines whether the user presence sensor 56 detects the presence of a user. If the user presence sensor 56 detects the presence of a user, the method continues at step 276. Otherwise, the method remains at 274.

At step 276, the controller 54 determines whether the trigger switch 18*a* is open. If the trigger switch 18*a* is open, the method continues at step 278. Otherwise, the method returns to step 274.

At step 278, the controller 54 controls the motor 32 to drive the flywheel 34. For example, the controller 54 may control the motor 32 to increase the speed of the flywheel 34 to the target speed S1. At step 280, the controller 54 determines whether the period for which the flywheel 34 has been continuously driven is less than the first period. If the flywheel driven period is less than the first period, the method continues at step 282. Otherwise, the method continues at step 284. At step 284, the controller 54 controls the motor 32 to stop driving the flywheel 34 and thereby executes a timeout.

At step 282, the controller 54 determines whether the user presence sensor 56 detects the presence of a user. If the user presence sensor 56 detects the presence of a user, the method continues at step 286. Otherwise, the method continues at step 284 and a timeout occurs.

At step 286, the controller 54 determines whether the trigger switch 18*a* is closed. If the trigger switch 18*a* is closed, the method continues at step 288. Otherwise, the method returns to step 280.

At step 288, the controller 54 controls the motor 32 to stop driving the flywheel 34. At step 290, the controller 54 controls the actuator 44 to engage the driver 28 with the flywheel 34, and thereby actuate the driver 28 to drive the fastener F into the workpiece. If the target speed S1 is different than (e.g., less than) the target speed S2 (e.g., the firing speed), the controller 54 may control the motor 32 to adjust the speed of the flywheel 34 to the target speed S2 before controlling the actuator 44 to engage the driver 28 with the flywheel 34.

After step 290, the method continues at step 292. In various implementations, the controller 54 may control the motor 32 to drive the flywheel 34 after step 290 and before step 292 regardless of whether the contact trip switch 50 or the trigger switch 18*a* is closed. At step 292, the controller 54 determines whether the trigger switch 18*a* is closed. If the trigger switch 18*a* is closed, the method continues at step 294. Otherwise, the method returns to step 280.

At step 294, the controller 54 determines whether the period for which the flywheel 34 has been continuously driven is less than the second period. If the flywheel driven period is less than the second period, the method continues at step 292. Otherwise, the method continues at step 284 and a timeout occurs.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In this application, including the definitions below, the term "module" or the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples, the interface circuits may include wired or wireless interfaces that are connected to a local area network (LAN), the Internet, a wide area network (WAN), or combinations thereof. The functionality of any given controller of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A fastening tool for installing a fastener into a workpiece, the fastening tool comprising:
 - a driver;
 - a motor assembly including a motor, a flywheel, and an actuator; and
 - a controller configured to:
   - control the motor to drive the flywheel when a first input satisfies a first condition;
   - control the actuator to engage the driver with the flywheel, and thereby actuate the driver to drive the fastener into the workpiece, when a second input satisfies a second condition;
   - control the motor to stop driving the flywheel when the motor has driven the flywheel for a first period and the first input has satisfied the first condition for at least the first period; and
   - control the motor to stop driving the flywheel when the motor has driven the flywheel for a second period and at least one of:
     - the first input no longer satisfies the first condition; and
     - the second input does not satisfy the second condition.

2. The fastening tool of claim 1 wherein the controller is configured to control the motor to stop driving the flywheel when the motor has driven the flywheel for the second period and the first input no longer satisfies the first condition.

3. The fastening tool of claim 1 wherein the controller is configured to control the motor to stop driving the flywheel when the motor has driven the flywheel for the second period and the second input does not satisfy the second condition.

4. The fastening tool of claim 1 wherein the duration of the second period is different than the duration of the first period.

5. The fastening tool of claim 4 wherein the duration of the second period is greater than the duration of the first period.

6. The fastening tool of claim 1 further comprising a contact trip switch and a trigger switch, wherein:
 - the first input satisfies the first condition when the contact trip switch is closed; and
 - the second input satisfies the second condition when the trigger switch is closed.

7. The fastening tool of claim 6 wherein the controller is configured to control the actuator to actuate the driver when both the contact trip switch and the trigger switch are closed.

8. The fastening tool of claim 6 wherein, after the driver is actuated, the controller is configured to control the motor to drive the flywheel regardless of whether the contact trip switch or the trigger switch is closed.

9. The fastening tool of claim 6 wherein, after the driver is actuated to perform a discharge, the controller is configured to:

control the actuator to actuate the driver for a second time when the contact trip switch has been opened and closed since the discharge and the trigger switch is closed;

control the motor to stop driving the flywheel when the contact trip switch has been held closed since the discharge and the motor has driven the flywheel for the first period; and control the motor to stop driving the flywheel when the contact trip switch has been opened since the discharge, at least one of the contact trip switch and the trigger switch is open, and the motor has driven the flywheel for the second period.

10. The fastening tool of claim 6 wherein, after the driver is actuated to perform a discharge, the controller is configured to:

control the actuator to actuate the driver for a second time when both the trigger switch and the contact trip switch are closed and have been opened since the discharge;

control the motor to stop driving the flywheel when the contact trip switch has been held closed since the discharge and the motor has driven the flywheel for the first period; and control the motor to stop driving the flywheel when the contact trip switch has been opened since the discharge, at least one of the contact trip switch and the trigger switch is open, and the motor has driven the flywheel for the second period.

11. The fastening tool of claim 1 wherein, during the first and second periods, the controller is configured to control the motor to adjust the speed of the flywheel to a target flywheel speed for driving the fastener into the workpiece.

12. A fastening tool for installing a fastener into a workpiece, the fastening tool comprising:

a contact trip switch;

a trigger switch;

a driver;

a motor assembly including a motor, a flywheel, and an actuator; and a controller configured to:

control the motor to drive the flywheel when the trigger switch is closed;

control the actuator to engage the driver with the flywheel, and thereby actuate the driver to drive the fastener into the workpiece, when the contact trip switch is closed;

control the motor to stop driving the flywheel when the contact trip switch is open, the motor has driven the flywheel for a first period, and the trigger switch has been held closed for at least the first period; and control the motor to stop driving the flywheel when the motor has driven the flywheel for a second period and at least one of the contact trip switch and the trigger switch is open, wherein the duration of the second period is different than the duration of the first period.

13. The fastening tool of claim 12 wherein the duration of the second period is greater than the duration of the first period.

14. The fastening tool of claim 12 wherein the controller is configured to control the actuator to actuate the driver when both the contact trip switch and the trigger switch are closed.

15. The fastening tool of claim 12 wherein, after the driver is actuated, the controller is configured to control the motor to drive the flywheel regardless of whether the contact trip switch or the trigger switch is closed.

16. The fastening tool of claim 12 wherein, after the driver is actuated to perform a discharge, the controller is configured to:

control the actuator to actuate the driver for a second time when the contact trip switch is closed and the trigger switch has been opened and closed since the discharge;

control the motor to stop driving the flywheel when the trigger switch has been held closed since the discharge and the motor has driven the flywheel for the first period; and control the motor to stop driving the flywheel when the trigger switch has been opened since the discharge, at least one of the contact trip switch and the trigger switch is open, and the motor has driven the flywheel for the second period.

17. The fastening tool of claim 12 wherein, after the driver is actuated to perform a discharge, the controller is configured to:

control the actuator to actuate the driver for a second time when the contact trip switch has been opened and closed since the discharge and the trigger switch is closed;

control the motor to stop driving the flywheel when the trigger switch has been held closed since the discharge and the motor has driven the flywheel for the first period; and control the motor to stop driving the flywheel when the trigger switch has been opened since the discharge, at least one of the contact trip switch and the trigger switch is open, and the motor has driven the flywheel for the second period.

18. The fastening tool of claim 12 wherein, during the first and second periods, the controller is configured to control the motor to adjust the speed of the flywheel to a target flywheel speed for driving the fastener into the workpiece.

19. A fastening tool for installing a fastener into a workpiece, the fastening tool comprising:

a sensor;

a trigger switch;

a driver;

a motor assembly including a motor, a flywheel, and an actuator; and a controller configured to:

control the motor to drive the flywheel when the sensor detects the presence of a user;

control the actuator to engage the driver with the flywheel, and thereby actuate the driver to drive the fastener into the workpiece, when the trigger switch is closed;

control the motor to stop driving the flywheel when the trigger switch is open and the motor has driven the flywheel for a first period; and control the motor to stop driving the flywheel when the sensor no longer detects the presence of the user and the motor has driven the flywheel for a second period, wherein the duration of the second period is different than the duration of the first period.

20. The fastening tool of claim 19 further comprising a contact trip switch, wherein the controller is configured to control the actuator to actuate the driver when both the contact trip switch and the trigger switch are closed.

21. The fastening tool of claim 19 further comprising a handle, wherein the sensor is contact sensor on the handle.

22. The fastening tool of claim 19 wherein the sensor is an accelerometer configured detect when the fastening tool is at least one of picked up by the user and in use.

23. The fastening tool of claim 19 wherein the sensor is a proximity sensor configured to detect the presence of a device on the person of the user.

24. The fastening tool of claim 19 wherein the sensor is a Bluetooth sensor configured to communicate with a Bluetooth-enabled device on the person of the user.

* * * * *